United States Patent [19]
Jones et al.

[11] 3,998,373
[45] Dec. 21, 1976

[54] LENGTH COMPENSATOR FOR FRICTION WELDING MACHINES

[75] Inventors: Thaddeus M. Jones, St. Joseph County, Ind.; Edward L. Johnson, Peoria County, Ill.; Jozef Kiwalle, Delaware County, Pa.

[73] Assignee: Production Technology Inc., Peoria, Ill.

[22] Filed: Sept. 15, 1975

[21] Appl. No.: 613,679

[52] U.S. Cl. .................................. 228/2; 228/113; 156/73.5; 228/9
[51] Int. Cl.² ........................................ B23K 19/02
[58] Field of Search ................. 228/2, 9, 112, 113, 228/114; 156/73.5; 317/5; 33/143 L

[56] References Cited
UNITED STATES PATENTS

| | | | |
|---|---|---|---|
| 2,988,936 | 6/1961 | Cash | 228/9 |
| 3,549,076 | 12/1970 | Mills | 228/2 |
| 3,678,566 | 7/1972 | Ellis et al. | 228/9 X |
| 3,714,509 | 1/1973 | Coleman et al. | 317/5 |
| 3,720,993 | 3/1973 | Farmer et al. | 228/2 X |
| 3,888,405 | 6/1975 | Jones et al. | 228/2 |

*Primary Examiner*—Al Lawrence Smith
*Assistant Examiner*—K. J. Ramsey
*Attorney, Agent, or Firm*—Phillips, Moore, Weissenberger, Lempio & Strabala

[57] ABSTRACT

A device for controlling the rotational speed of a friction welder as a function of the combined length of the pair of parts to be welded, within predetermined tolerances, so as to produce welded pieces of uniform length in spite of minor variations in the lengths of the parts. Logic and sequencing circuitry specially adapted to carry out this function at minimum cost is also described.

16 Claims, 4 Drawing Figures

Fig. 1

LENGTH COMPENSATOR FOR FRICTION WELDING MACHINES

BACKGROUND OF THE INVENTION

Friction welding machines, both of the power-driven type and of the inertia type, are known in the art. In either type, a pair of parts to be welded are subjected to high-speed relative rotation and are then forced together axially until the heat of friction fluidizes their contact surfaces and welds them together.

Because of the fluidity of the contact surfaces, the pressure with which the parts are forced into contact with one another (usually called the upset pressure) causes the formation of a flash at the weld, and a consequent shortening (usually called the upset) of the welded piece with respect to the combined length of its parts.

The amount of upset in any given welding operation depends on three factors: (1) the upset pressure; (2) the length of time a frictional contact persists; and (3) the speed of relative rotation between the two parts. The upset pressure is a complex process control parameter and is not a suitable variable for the purposes contemplated herein. In friction welders of the inertial type, in which the weld is made by converting all the kinetic energy of a freely spinning flywheel into frictional heat and thereby stopping the flywheel, the time is not independently controllable. Consequently, the most practical parameter to control is the weld speed, i.e., in the case of an inertial welder, the initial rotational velocity of the flywheel when upset pressure is first applied.

U.S. Pat. No. 3,714,509 to Coleman et al describes apparatus for controlling, among other things, the weld speed of an inertia welder as a function of a manually selectable reference voltage. By varying this reference voltage, the amount of upset produced by the weld can be accurately adjusted. However, unless the speed control is manually readjusted before each weld, or unless the lengths of the parts to be welded are held within uneconomically strict tolerances, the finished pieces produced by the apparatus of the Coleman patent will vary in overall length through a range equal to the sum of the tolerances of the individual parts to be welded together. No practical solution to this problem in automated production equipment has heretofore been known.

SUMMARY OF THE INVENTION

The device of this invention solves the problem of automatically producing welded pieces of uniform length by generating a speed control compensating signal which is a function of the combined length of the two parts to be welded, prior to the welding operation. This speed control compensating signal, when combined with the manually selectable reference in the circuit of U.S. Pat. No. 3,714,509, will produce a variation in the amount of upset which will exactly compensate for the deviation of the combined length of the parts from their nominal dimension.

In order to permit measuring and welding operations (for different pairs or parts) to proceed asynchronously and simultaneously, the device of this invention provides a pair of analog memories which are sequentially loaded by successive measuring operations and are read on a first-in-first-out basis by the weld speed control circuitry.

The invention also provides novel circuitry for programming the measuring operation to prevent entry of unacceptable measurements into the memories, and for preventing the use of stale (and therefore probably inaccurate) measurement information stored in the memories. A novel scheme combining binary and decimal status logic provides for simple asynchronous sequencing of welding and measuring operations in the memory control circuitry. Compensation for temperature variations in the hydraulic oil is also provided.

It is the primary object of this invention to provide a length compensator for friction welding machines which will produce welded pieces of uniform length regardless of minor variations in the combined length of the parts pairs to be welded.

It is another object of the invention to provide, in a device of the type described, analog memory means for asynchronously storing measured length information, and digital sequencing means for conveying this information to the welding machine in the order in which it was stored.

It is a further object of the invention to provide a combined binary and decimal switching logic for accomplishing the sequencing with a minimum of logic circuitry.

It is yet another object of the invention to provide, in a device of the type described, timing means for preventing the use, by the welding machine, of measurement information which has become stale and has therefore probably lost its accuracy.

It is yet a further object of the invention to provide, by means of a partially decoded long binary counter, a programmed measuring sequence in a device of the type described which will prevent the entry of out-of-tolerance measurement information into the memory.

DESCRIPTION OF THE PREFERRED EMBODIMENT

Figure 1:
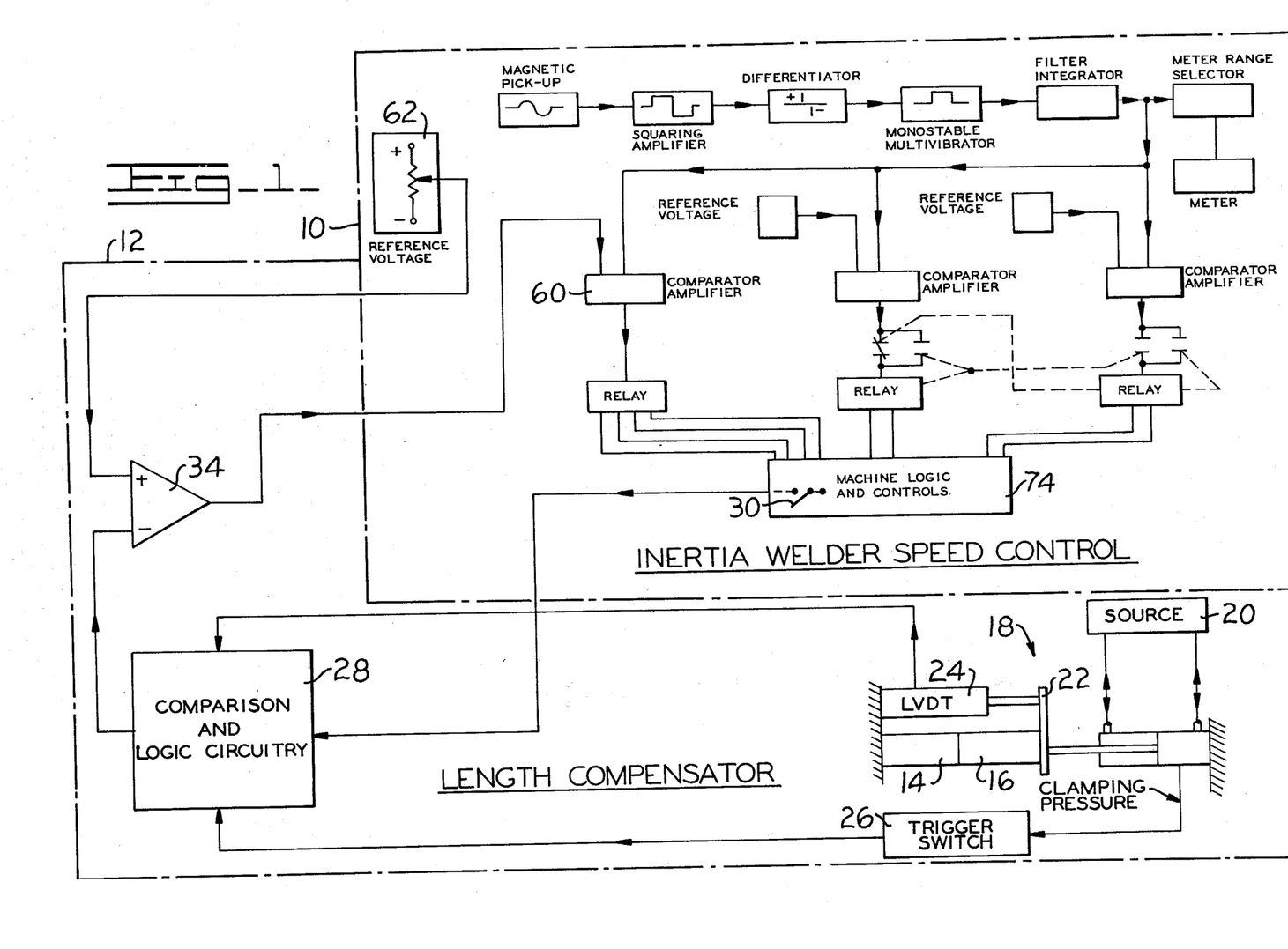
FIG. 1 is a block diagram showing the environment in which the device of this invention is used.

FIG. 1 shows the environment in which the device of this invention operates. The elements enclosed by the dot-dash line 10 are the elements of the prior art inertia welder speed control shown in FIG. 2 of U.S. Pat. No. 3,714,509, which function in the manner described in that patent except for the modification explained herein.

The elements enclosed by dot-dash line 12 are the elements of the length compensator of this invention. The parts 14, 16 to be welded together are first placed in the measuring jig 18, and clamping pressure is applied from a hydraulic or pneumatic supply source 20 to the clamping plate 22. The plate 22 is connected to a linear variable displacement transducer (LVDT) 24, which puts out a signal representative of the axial position of plate 22.

When the parts 14, 16 are firmly clamped between the clamping plate 22 and the wall of jig 18, the clamping pressure closes trigger switch 26 for a purpose hereinafter described. At this time, the signal put out by LVDT 24 is representative of the combined length of the parts 14, 16.

The trigger signal from switch 26 and the length signal from LVDT 24 constitute two of the inputs of the comparison and logic circuitry 28, which will be described in more detail in connection with FIG. 2 hereof. The third input is the weld signal from the weld switch 30 which is part of the machine control and logic circuitry 74. Specifically, the weld switch 30 corresponds to the "start cycle" switch 76 in FIG. 3 of U.S. Pat. No. 3,714,509.

The output of the comparison and logic circuitry 28 is a compensation signal which is fed to the inverting input of mixer 34. For the purposes of this invention, the connection shown in FIG. 2 of U.S. Pat. No. 3,714,509 between the reference voltage potentiometer 62 (i.e., the nominal weld speed control) and the comparator amplifier 60 is removed. Instead, the output of nominal weld speed control 62 is fed to the noninverting input of mixer 34. The output of mixer 34 is a length-compensated weld speed reference signal which constitutes the reference input to comparator amplifier 60 of the welder control 10.

Figure 2A:
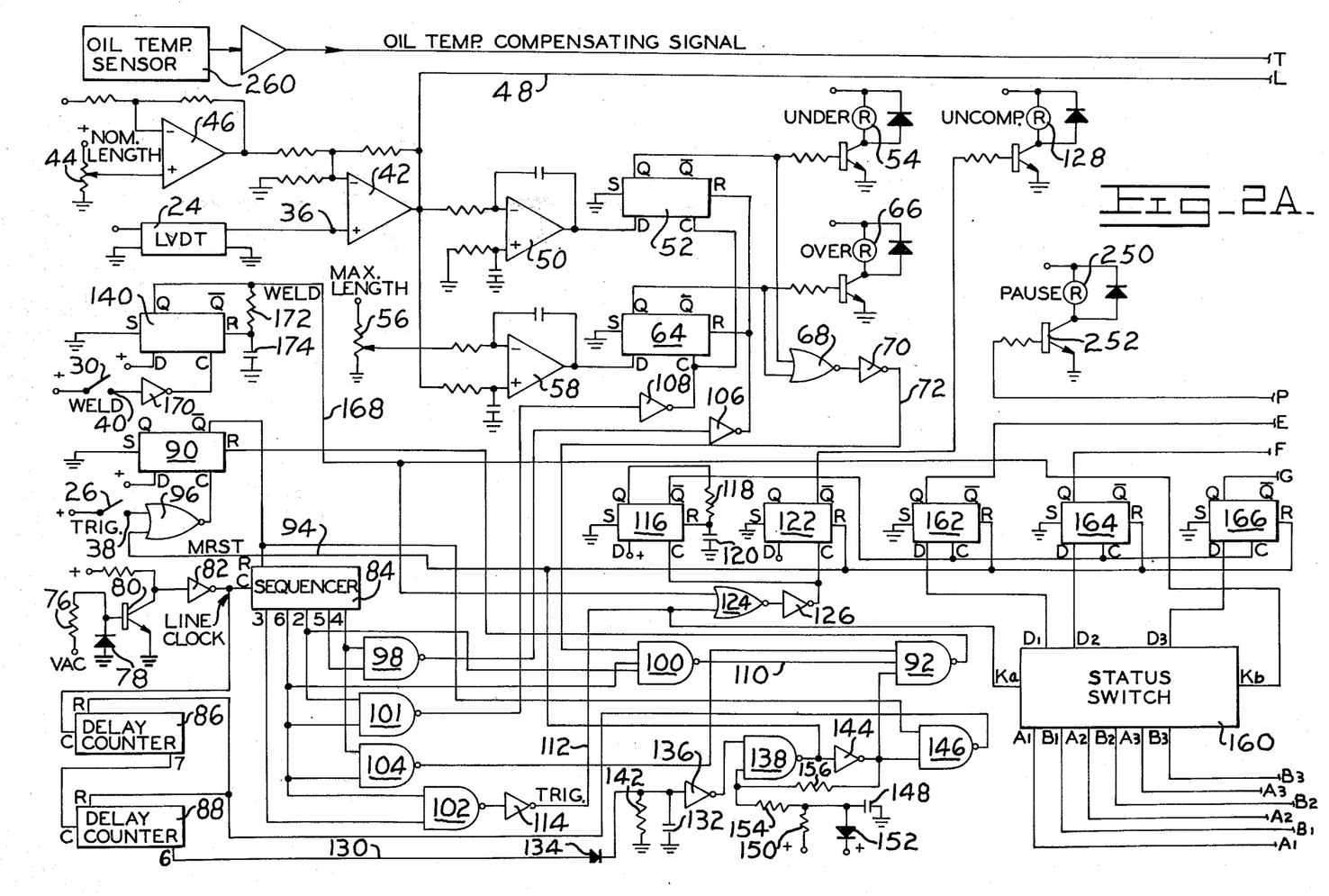
FIG. 2 (composed of FIGS. 2a and 2b) is a circuit and logic diagram of the length compensator of this invention.
Figure 2B:
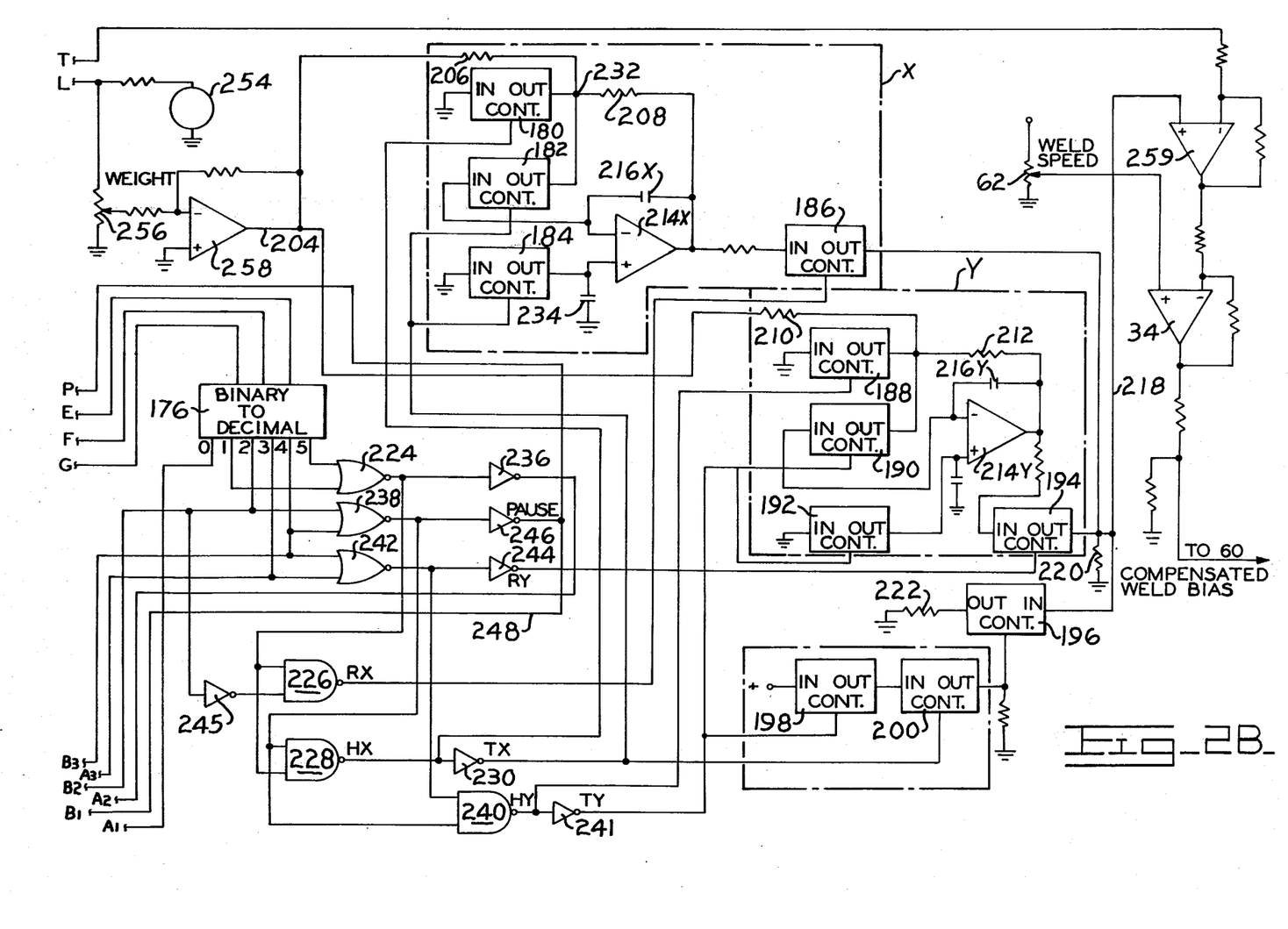

Turning now to FIG. 2 (which consists of FIGS. 2a and 2b placed side by side), the functioning of the comparison and logic circuitry 28 will be explained in more detail. The three inputs 36, 38, 40 from the LVDT 24, trigger switch 26, and weld switch 30, respectively, are shown near the left edge of FIG. 2a. The signal from LVDT 24, which is an analog signal representative of the overall length of the parts 14, 16, is applied to the noninverting input of deviation amplifier 42. The inverting input of deviation amplifier 42 receives a nominal length signal produced by nominal length control potentiometer 44 and inverted by analog inverter 46. The deviation signal produced by deviation amplifier 42 appears on memory bus 48 and is an analog representative of the amount by which the actual combined length of parts 14, 16 exceeds their selected nominal length.

The nominal length control is used to set the minimum combined length of the parts 14, 16 with which a satisfactory weld can be effected. For this reason, the deviation signal from amplifier 42 is applied to the inverting input of undersize detector 50 whose noninverting input is grounded. If the deviation signal is negative, an enabling signal is applied by detector 50 to the D input of undersize rejection flip-flop 52. This causes the Q terminal of flip-flop 52 to go high when its C terminal is next enabled as hereinafter described. This in turn actuates the undersize rejection relay 54 which may either initiate mechanical rejection of the parts 14, 16 or alert the machine operator to take remedial action.

Inasmuch as there are practical limits to the upper end of the weld speed range, there is a maximum combined length which the parts 14, 16 may not exceed. This maximum length is manually set by maximum deviation control potentiometer 56 whose output is applied to the inverting input of oversize detector 58. When the deviation signal applied to the noninverting input of detector 58 exceeds the preset maximum, an enabling signal is applied to the D input of oversize rejection flip-flop 64, whereupon oversize rejection relay 66 is actuated when the C input of flip-flop 64 is next enabled.

As soon as either flip-flop 52 or 64 indicates a reject condition, NOR gate 68 and inverter 70 produce a reject signal on line 72 for a purpose hereinafter described.

Turning now to the function sequencing portions of the circuit, it will first be seen that the AC power line voltage $V_{AC}$ applied to resistor 76 is a half-wave rectified by diode 78 and squared by transistor 80 and inverter 82. The output of inverter 82 is a train of clock pulses at the power line frequency. These clock pulses drive a programmer or sequencer 84 and a two-minute delay circuit composed of counters 86 and 88, whose purpose will be described below.

The sequencer 84 is a seven-stage binary counter which starts counting when its R input goes low. This occurs whenever trigger flip-flop 90 is set, i.e., whenever three conditions are satisfied: (1) the output of NAND gate 92 is low; (2) there is no master reset (MRST) signal on line 94; (3) the trigger switch 26 is opened as the clamp pressure is released (in the absence of a MRST signal, the NOR gate 96 functions as an inverter).

The numbers adjacent the outputs at the bottom of sequencer 84 indicate the pulse count, in powers of two which cause that terminal to go high. It will thus be seen that a count of forty-eight (48) causes the output of NAND gate 98 to momentarily go low, a count of sixty-eight (68) does the same to the output of NAND gates 100 (in the presence of a reject condition) and 101, a count of seventy-two (72) similarly operates the NAND gate 102, and a count of eighty (80) momentarily zeroes the output of NAND gate 104.

Thus, and due to the action of inverter 106, the count of forty-eight (48) resets the reject flip-flops 52 and 64. The count of sixty-eight (68), due to inverter 108, clocks any reject condition appearing at the D input of flip-flop 52 or 64 into the affected flip-flop and operates the appropriate reject delay 54 or 66. Simultaneously, the reject condition, in the manner previously described, drives line 72 (i.e., the top input to NAND gate 100) high. Inasmuch as the other two inputs to NAND gate 100 are also high at count sixty-eight (68), line 110 momentarily goes low, and the output of NAND gate 92 is momentarily driven high to reset trigger flip-flop 90 and sequencer 84.

Consequently, when a reject condition occurs, the sequencing program is stopped at count sixty-eight (68) and the action of trigger switch 26 is ignored.

If no reject condition is present, the program sequence proceeds to count seventy-two (72), at which NAND gate 102 is actuated to produce a momentary positive-going trigger signal on line 112 through inverter 114. The trigger signal in turn sets single-pulse generator 116 (a monostable multivibrator timed by resistor 118 and capacitor 120), and comparison flip-flop 122 through the action of NOR gate 124 and inverter 126. The time constant of multivibrator 116 is less than eight clock cycles for a reason hereafter explained. Setting of the comparison flip-flop 122 disables the "uncompensated" relay 128 and indicates that a valid measurement has been made.

The making of a valid measurement results in an entry of the measured data in the analog memory which will be described hereinafter. However, by virtue of the analog nature of the data, it must be used reasonably promptly or it will deteriorate. Preventing the use of deteriorated data is the function of the timing circuit consisting of delay counters 86, 88.

Like the sequencer 84, the delay counters 86, 88 are seven-stage binary counters connected in series to produce an output on line 130 on the count of $2^{13}$. Inasmuch as the clock input is at the 60Hz power line frequency, this count occurs after about 137 seconds (164 seconds on a 50Hz power line). At that time, the overtime signal on line 130 rapidly charges the capacitor 132 through blocking diode 134. When the potential on capacitor 132 exceeds the threshold voltage of inverter 136, the upper input of NAND gate 138 goes low, and the output of NAND gate 138 (which is the MRST signal on line 94) goes high. The MRST signal resets all of the logic of the length compensator to its starting condition and clears the memories. Resetting of the comparison flip-flop 122 actuates the "uncompensated" relay 128 and thereby advises the operator that the length compensator has been deactivated. The "uncompensated" relay 128 remains actuated until either a new measurement program has progressed to count seventy-two of the sequencer, or the weld flip-flop 140 resets. In the event that a weld signal occurs while the "uncompensated" relay 128 is actuated it will remain actuated.

Upon the disappearance of the overtime signal on line 130 (by the resultant resetting of counters 86, 88 through gate 146), the capacitor 132 discharges through resistor 142 to ready itself for a renewed occurrence of the overtime signal which will recur every 137 seconds until a new program sequence is initiated. The capacitor 132 is provided to prevent the MRST signal from being triggered by circuit transients.

The normal condition during the proper functioning of the welding machine is for the output of NAND gate 138 to be low and the output of inverter 144 to be high. In this condition, the resetting of the trigger flip-flop 90 and sequencer 84 operates NAND gate 146 to disable the reset inputs of delay counters 86, 88. Consequently, the delay counters 86, 88 start to count at the end of the program sequence and are reset when a new program sequence starts. Thus, as long as the trigger switch 26 opens every 137 seconds or less, no master reset operation will occur.

The device of this invention also provides means for resetting the length comparator when the power is first turned on. At that time, capacitor 148 is discharged. When the power comes on, it charges through resistor 150. During this time, the diode 152 is reverse biased. While the capacitor 148 charges, the lower input of NAND gate 138 is momentarily low, causing the MRST signal to appear. As the potential on capacitor 148 reaches the threshold of NAND gate 138, the MRST signal disappears, and the length comparator is ready to function. The resistors 154, 156 provide switching hysteresis by driving the lower input of NAND gate 138 strongly high as soon as the output of inverter 144 goes high. When the power is turned off, capacitor 148 rapidly discharges through the now forward-biased diode 152.

It will be noted that both the overtime and power-up conditions cause the bottom inputs of NAND gates 92 and 146 to go low, thereby resetting the trigger flip-flop 90, sequencer 84, and delay counters 86, 88.

The return of the single-pulse generator 116 to its reset state following its momentary setting as hereinabove described clocks the current status information from the D terminals of status switch 160 into status flip-flop 162, 164 and 166. The status switch 160 operates in such a manner that while a trigger signal from line 112 appears at its $K_a$ input, the states of the A terminals are transmitted to the correspondingly numbered D terminals. Likewise, as long as a weld signal from line 168 is applied to the $K_b$ input, the states of the B terminals are transmitted to the correspondingly numbered D terminals.

The weld signal on line 168 is produced by the opening of weld switch 30 at the end of a welding operation, which causes inverter 170 to clock into weld flip-flop 140 the positive potential at its D input. The time delay circuit composed of resistor 172 and capacitor 174 causes the weld flip-flop 140 to reset after a short interval. However, the weld signal 168 persists long enough to allow single-pulse generator 116 to reset after the leading edge of the weld signal 168 has set generator 116 and comparison flip-flop 122 through NOR gate 124 and inverter 126. In this respect, it will also be noted that the trigger signal on line 122 persists for eight counts of the sequencer 84, which allows sufficient time for the single-pulse generator 116 to clock data into status flip-flops 162, 164 and 166 before the trigger signal ceases.

It will be seen from the foregoing description that A status information is clocked into status flip-flops 162, 164 and 166 each time a valid measurement has been made, and that B status information is clocked into them each time a weld operation is initiated. Thus, the A status determines into which memory the deviation signal will be loaded, and the B status determines which memory will be read out.

Moving now to FIG. 2b, the connections along its left margin are labeled to match the corresponding connections along the right margin of FIG. 2a. The binary status information from status flip-flops, 162, 164, 166 appearing on lines E, F and G is applied to the binary input of binary-to-decimal converter 176, where it is decoded to energize the appropriate one of the six decimal outputs labeled to 0 to 5. The purpose of the memory switching logic shown in FIG. 2b is to sequentially hold analog deviation information in the next available memory cell each time a trigger signal occurs, and to read out the oldest held information each time a weld signal occurs. It will be understood that, particularly when the welding machine is operated manually, several trigger operations may occur between two welding operations.

The memory switching circuit operates as follows: Following a master reset or power-up, status flip-flops 162, 164, 166 are reset, and the 0 output of binary-to-decimal converter 176 is consequently high. Electronic switches 180, 186, 188 and 194 are open, and switches 182, 184, 190, 192, 196, 198 and 200 are closed. In this condition, the memory cells X and Y track the analog weighted deviation signal appearing on line 204 because resistors 206, 208 and 210, 212 are connected as feedback networks for memory amplifiers 214X and 214Y, respectively. Consequently, the potential on memory capacitors 216X and 216 Y follows the variations of the signal on line 204. Memory output line 218 is grounded through both the load resistor 220 and the low-resistance grounding resistor 222.

If a weld signal occurs first (which it should not), nothing happens. The status flip-flops store a binary 000, and the memories remain unaffected. In this situation, the grounded status of line 218 causes weld speed selector 62 to be the sole determinant of the weld signals.

If a trigger signal occurs first (as it should), the status flip-flops store a binary 100 on lines E, F and G, and the converter 176 responds by switching to output 1. This operates NOR gate 224 and consequently disables NAND gate 226. NAND gate 226 thereby causes switch 186 to close, whereupon the output of memory amplifier 214X is connected to output line 218. Simultaneously, NOR gate 224 enables NAND gate 228 which, with the assistance of inverter 230, closes switch 180 and opens switches 182, 184 and 200. The opening of the latter also opens switch 196 and removes the ground connection from line 218.

The operation of switches 180, 182 and 184 grounds junction 232 and disconnects the feedback and ground connections from the inputs of memory amplifier 214X. The analog potential at junction 232 existing at the time of the trigger operation remains stored on memory capacitor 216X, and memory cell X thus goes into the holding mode. The purpose of capacitor 234, which should be identical to capacitor 216X, is to compensate for the input offset current of memory amplifier 214X during the holding mode.

If a weld operation now occurs, its completion opens weld switch 30 and produces a weld signal which causes the status flip-flops to clock in a binary OOO, whereupon the circuit returns to its initial null condition with both memory cells in the tracking mode.

If, however, a second measuring operation occurs before a weld operation, its completion opens the trigger switch 26 and produces, in due course, a trigger signal which loads a binary 010 (note the action of inverter 236) into the status flip-flops. As a result, converter 176 switches to output 2, disabling NOR gate 224 and enabling NOR gate 238. NAND gate 228 remains disabled, keeping memory cell X in the holding mode. In addition, NAND gate 240 becomes disabled, switching memory cell Y into the holding mode with the help of inverter 241. Switch 194, however, remains open because NOR gate 242 is still disabled and the output of inverter 244 is still low. Switch 186 remains closed because NAND gate 226 remains disabled through inverter 245.

Memory cell X now contains the first measurement, memory cell Y contains the second, and memory cell X is connected to output line 218. Inverter 246 drives line 248 high, causing the P line to energize pause relay 250 through relay driver 252. Pause relay 250 actuates an appropriate device (not shown) which alerts the operator that no further memory cells are available and that no further measurement operations are to be performed. Alternatively, in an automated operation, the pause relay 250 may directly stop the measuring mechanisms. If, in spite of the warning of the pause relay, a third measurement is performed without an intervening weld operation, the trigger signal loads a binary OOO into the status flip-flop and resets the entire memory switching circuit, clearing both memory cells in the process.

If, however, a weld operation now occurs, it will proceed according to the analog information stored in memory cell X, which is currently connected to output line 218. At the end of the weld operation, the weld signal clocks a binary 110 into the status flip-flops, and converter 176 switches to output 3. This enables NOR gate 242, closing switch 194 through inverter 244. Simultaneously, NAND gate 226 becomes enabled from inverter 245, causing switch 186 to open. NAND gate 228 becomes enabled, switching memory cell X back to the tracking mode. Grounding of output line 218 by the closure of switch 200 is prevented, however, because switch 198 is still open.

A trigger operation at this point loads a binary 001 into the status flip-flops, and converter 176 switches to output 4. This enables NOR gate 238 and holds NOR gate 242 in its enabled condition. Consequently, NAND gate 226 remains enabled (switch 186 open), NAND gate 228 becomes disabled (memory cell X switched from tracking to holding mode), and NAND gate 240 remains disabled (switch 194 closed). Output 4 actuates the pause relay 250 through NOR gate 238 and inverter 246.

If, instead of a trigger operation, a second weld operation had taken place directly after the first, a binary 000 would have been entered into the status flip-flops, returning the circuit to its null condition.

A weld operation following an output 4 state of converter 176, however, would load a binary 101 into the status flip-flops, causing converter 176 to switch to output 5. The effect of this is electrically the same as if the converter had switched to output 1, so that this state holds memory cell X and connects it to output line 218 while allowing the disconnected memory cell Y to track.

A trigger operation during an output 4 state in violation of the pause indication loads a binary 000 into the status flip-flops and resets the circuit, clearing both memories.

The unused decimal outputs of converter 176 are connected to the O output, so that spurious signals resulting in an invalid binary code will reset the device to the null state.

The above-described sequence of operations is graphically illustrated in Table I.

Figure 3:
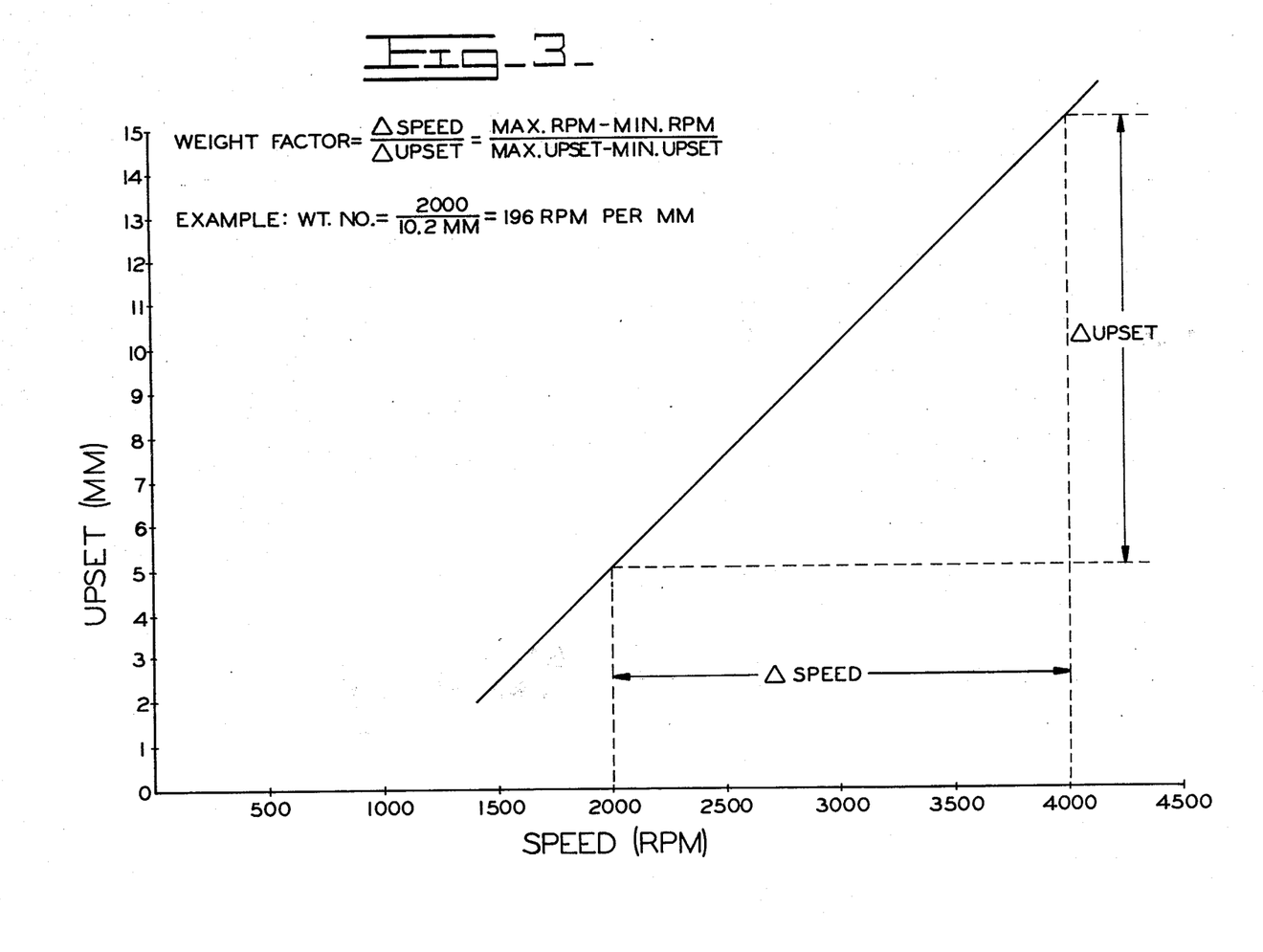
FIG. 3 is a graphical representation showing the method of determining the weight factor for the device of this invention.

The deviation signal on line 48 (FIG. 2a) is applied to deviation meter 254 and to weighting potentiometer 256. Inasmuch as the number of RPM required to produce a given change in upset varies according to the material and geometry of the parts 14, 16, the deviation signal on line 48 has to be multiplied by a proportionality factor known as the weight before it can be used. The manner of determining this factor is shown in FIG. 3, as discussed below. The output of weighting potentiometer 256 is amplified and inverted in inverter 258, whose output appears on line 204.

The selected memory cell read-out appearing on output line 218 is combined in combining amplifier 259 with a temperature correction signal generated by hyraulic oil temperature sensor 260 (FIG. 2a). The output of amplifier 259 (in which the weighted deviation signal is inverted due to the action of inverter 258) is in turn applied to the inverting input of final combining amplifier 34, where it is combined with the basic weld speed signal set on weld speed control 62. The output of amplifier 34 is an analog weld speed control signal compensated for parts length and oil temperature. When applied to the comparator amplifier 60 (FIG. 1), this signal will cause the length of the welded piece to be constant.

The operation of the length compensator of this invention is as follows:

1. The minimum upset necessary to produce an acceptable weld, and the maximum surface velocity (which in turn determines the maximum upset) for the material involved are first determined from standard metallurgical tables. This determines the minimum and maximum combined parts lengths which the machine can accommodate.

2. With the length compensator in use and the weight control 256 set at zero, a series of welds are made at different weld speeds to produce a graph such as illustrated by FIG. 3, which determines the weight factor (e.g., in RPM per millimeter of upset change) for the particular type of parts involved. The weight factor thus determined is set on the weight control 256.

3. A pair of parts 14, 16 having the minimum acceptable combined length is placed into the measuring position. The nominal length potentiometer 44 is then adjusted until the meter 254 reads zero. The setting of the potentiometer is fine-adjusted until it is just low enough so that the "under" relay 54 is not actuated when the length compensator is turned on and off.

4. The previously determined maximum combined parts length is entered on potentiometer 56. The circuit is then reset by waiting until "uncompensated" relay 128 actuates due to the expiration of the time dealy set by delay counter 86, 88. This indicates that a master reset operation has taken place, and that the length compensator is now ready for use.

a. sensing and comparing means for producing a signal representative of the deviation of the combined length of a pair of parts to be welded from a predetermined norm;

b. memory means for storing said signal; and c. means for selectively using said stored signal to modify a preset weld speed signal for said welder so as to produce welded pieces of uniform length regardless of said combined length deviation.

4. The length compensator of claim 3, in which said memory means include a plurality of memory cell means, and which further comprises memory control means for sequentially storing successive ones of said signals in said memory cell means, and for selecting said stored signals for weld speed signal modifying use in the order in which they were stored.

5. The length compensator of claim 4, in which said memory control means involve a combination of binary and decimal logic.

TABLE I

| Current decimal output state | Status code produced at "A" terminals | Status code produced at "B" terminals | "X" cell state | "Y" cell state | Read-out | Pause relay | Operation | New decimal output state |
|---|---|---|---|---|---|---|---|---|
| 0 | 100 | 000 | track | track | ground | off | trigger weld(invalid) | 1 0 |
| 1 | 010 | ·000 | hold | track | X | off | trigger weld | 2 0 |
| 2 | 000 | 110 | hold | hold | X | on | trigger(invalid) weld | 0 3 |
| 3 | 001 | 000 | track | hold | Y | off | trigger weld | 4 0 |
| 4 | 000 | 101 | hold | hold | Y | on | trigger(invalid) weld | 0 5 |
| 5(same as 1) | 010 | 000 | hold | track | X | off | trigger weld | 2 0 |
| Invalid states (same as 0) | 100 | 000 | track | track | ground | off | trigger weld(invalid) | 1 0 |

We claim:

1. In combination with a friction welding machine having a variable weld speed, length comparison apparatus comprising:
   a. means for measuring the combined length of a pair of parts to be welded and producing an output representative of said combined length; and
   b. means responsive to said output of said measuring means for varying the weld speed of said friction welding machine so as to produce welded pieces of uniform length regardless of variations in the combined length of said parts.

2. A length compensator for friction welders having a variable weld speed, comprising:
   a. sensing means for producing a signal representative of the combined length of a pair of parts to be welded;
   b. means for producing a predetermined nominal combined length signal for said pair of parts;
   c. weld speed setting means for producing a weld speed signal adapted to control the weld speed of said variable speed friction welder to produce a welded piece of predetermined length from a pair of parts having a predetermined combined length; and
   d. means responsive to said combined length signal and said nominal length signal for modifying said weld speed signal in accordance with the deviation of said sensed combined length from said nominal combined length.

3. A length compensator for friction welders, comprising:

6. A length compensator for a variable speed friction welder having weld switch means associated therewith, said weld switch means being actuated when a welding operation is being performed, comprising:
   a. measuring means for measuring the combined length of a pair of parts to be welded, said measuring means including trigger switch means actuated when a measurement is being made;
   b. analog signal generating means associated with said measuring means for producing analog signals representative of the deviation of the measured combined length of pairs of said parts from a predetermined norm;
   c. memory means including a plurality of memory cells for storing said analog signals; and
   d. memory control means for storing one of said analog signals in the next available memory cell upon the completion of each actuation of said trigger switch means, using the least recently stored analog signal to control the weld speed of said welder, and clearing said least recently stored signal from its memory cell upon actuation of said weld switch means.

7. The length compensator of claim 6, further comprising means for predetermining tolerance limits for the allowable deviation of said combined length from said norm and sequenced means for preventing the storage of analog signals representing deviations outside said predetermined tolerance limits.

8. The length compensator of claim 7 in which said sequenced means include a partially decoded binary counter.

9. The length of compensator of claim 7, in which said counter is decoded following each trigger switch actuation to sequentially; (1) clear from the compensator any previously entered out-of-tolerance information; (2) clock new tolerance information into the compensator, and reset if the new tolerance information indicates an out-of-tolerance condition; (3) apply a trigger signal to said memory control means to cause storage of an analog signal; and (4) reset.

10. The length compensator of claim 6, further comprising means for removing said analog signals from storage if more than a predetermined time elapses between successive signal storage operations.

11. The length compensator of claim 6, further comprising means for clearing said memory means and resetting said memory control means when power is first applied to said length compensator.

12. The length compensator of claim 6, further comprising means for selectively applying a weight factor to said analog signals.

13. The length compensator of claim 12, further comprising means for sensing, and compensating for the hydraulic oil temperature of the welder.

14. The length compensator of claim 6, in which said memory control means include:
   a. means for establishing a plurality of states each representative of a particular condition of each memory cell and of the identity of the memory cell being currently used to control weld speed; and
   b. means for switching from one of said states to another in accordance with whether the next occuring operation is a weld switch actuation or a trigger switch actuation.

15. The length compensator of claim 14 in which said state-establishing means is a binary-to-decimal converter, and said state-switching means is a binary means.

16. The method of producing welded pieces of uniform length on a friction welding machine, comprising the steps of:
   a. measuring the deviation of the combined length of a pair of parts to be welded from a predetermined norm; and
   b. varying the weld speed of the welding machine as a linear function of said deviation.

* * * * *